Dec. 5, 1939.  T. E. BOYER ET AL  2,182,246
PACKING GLAND MOUNTING
Filed March 29, 1938
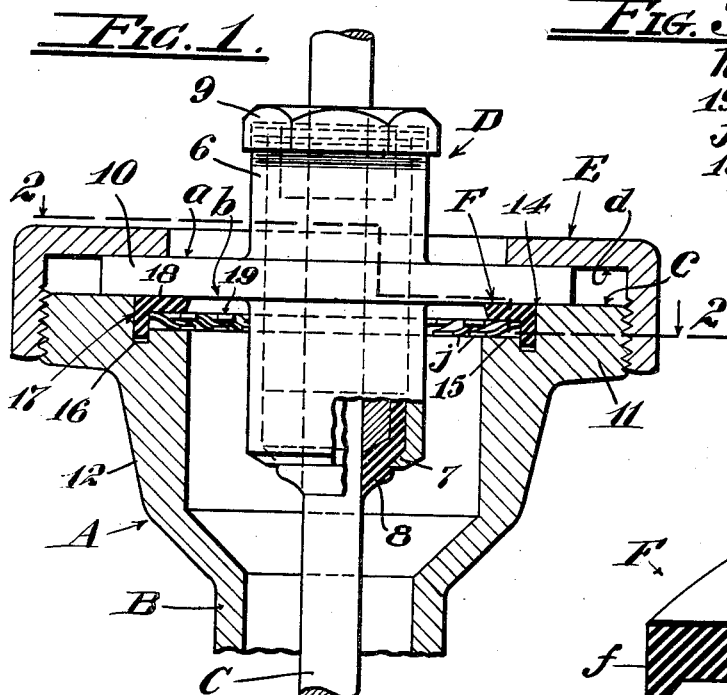
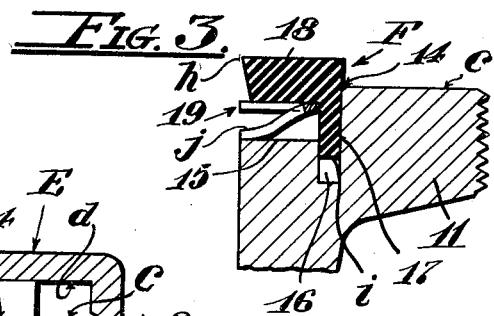
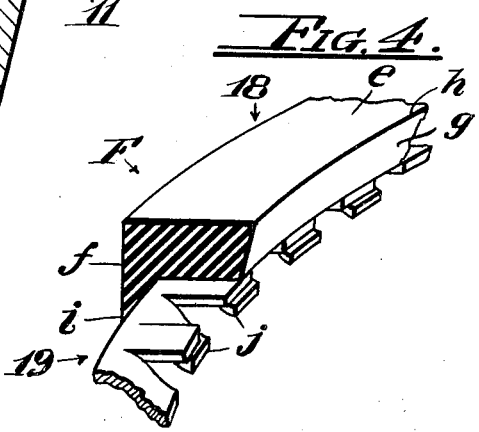
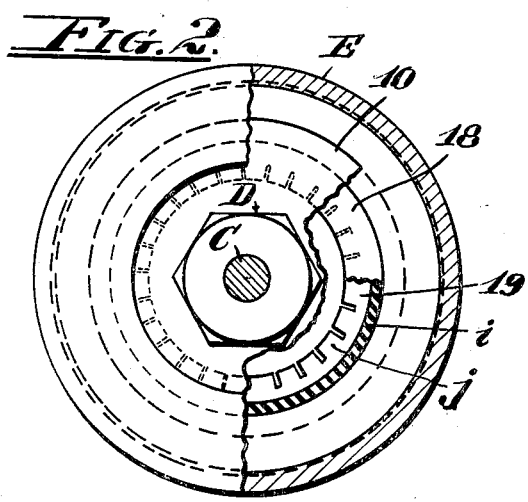
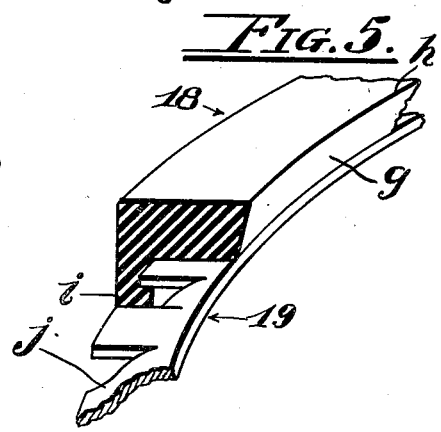
Inventors
Tanner E. Boyer
and Lester P. Stockman
Attorney

UNITED STATES PATENT OFFICE 2,182,246

PACKING GLAND MOUNTING

Tanner E. Boyer, Bell, and Lester P. Stockman, Los Angeles, Calif.

Application March 29, 1938, Serial No. 198,708

5 Claims. (Cl. 286—15)

This invention relates to a mounting for packing glands of the character employed in packing longitudinally reciprocal pump rods in oil wells and the like such as is set forth in our co-pending application for United States Letters Patent Serial Number 144,664, filed May 25, 1937.

An object of the invention is to provide a mounting for a packing gland which will permit transverse reciprocal movement of the gland under lateral thrusts imposed on the gland through the pump rod, thereby minimizing wear of the gland packing occasioned by such thrusts, and whereby frequent shut down for renewing packing of the gland will be obviated, thus increasing production of wells equipped with the invention over those fitted with the usual packing gland mounting construction.

Another object is to provide a construction in the gland mounting which while affording the desired lateral shifting movement of the gland, will afford a seal around the shiftable gland such as will prevent leaking of gases or liquids from the head box of the pump casing around the exterior of the gland.

Another object is to provide a seal of the above character which is self-compensating for wear so as to render it highly durable and thus reduce the necessity of replacement of worn parts to a minimum.

With the foregoing objects in view, together with such other objects and advantages as may subsequently appear, the invention is carried into effect as illustrated by way of example in the accompanying drawing, in which:

Fig. 1 is a view in vertical section partly in elevation showing the invention as applied;

Fig. 2 is a plan view partly in section as seen on the line 2—2 of Fig. 1;

Fig. 3 is an enlarged detail in section of the sealing ring as initially applied to the pump head;

Fig. 4 is a perspective view of a fragmentary portion of the sealing ring as detached; and Fig. 5 is a perspective view of a modified form of the sealing ring.

Referring to the drawing more specifically, A indicates generally the cylindrical head box of a pump tubing B, and C denotes a longitudinally reciprocal pump rod which extends through the box A into the pump tubing and is fitted in the usual manner at its lower end with a pump piston and is connected at its upper end with a walking beam, (not shown) as is common in oil well pump construction.

The pump rod C passes through a packing gland D which may be of any suitable construction but is here shown as comprising a wiper packing gland of the type set forth in the application for United States Patent of Tanner E. Boyer, Serial Number 79,043, filed May 11, 1936.

The gland D embodies a cylindrical housing 6 which encircles the pump rod C in spaced concentric relation thereto and the lower end of which housing is formed with an inwardly projecting marginal flange 7 the inner edge of which is spaced from the outer periphery of the rod C, and on which flange is seated a suitable packing and wiping element 8 held in place by a crowding ring 9 adjustably mounted on the upper end of the housing 6.

The gland housing 6 is formed intermediate its ends with a circumferentially extending continuous flange 10 having flat parallel upper and lower surfaces $a$ and $b$, and the box A is formed with a horizontally extending marginal flange 11 on the upper end thereof, having a flat upper face $c$, on which the flange 10 is slidably seated to afford a support for the gland D. The box A embodies a cylindrical side wall 12 the inner periphery of which is of a diameter exceeding the diameter of the portion of the housing 6 extending below the flange 10 so as to afford requisite clearance to permit movement of the gland radially in relation to the box A.

As a means for holding the flange 10 against excessive upward movement relative to the box A a clamp ring E having screw threaded engagement with the box A is positioned with its inner marginal portion overlying the flange 10 in loose sliding contact therewith; the ring E having an inturned marginal flange formed with a flat under face $d$ which is disposed in slidable contact with the flat top face of the shiftable flange 10.

In carrying out the present invention the box A is formed on its upper inner margin with a peripheral channel 14 which opens both to the upper end and to the inner periphery of the box, and which channel has a flat bottom wall 15 leading from the inner face of the wall 12 perpendicular thereto to an annular recess 16 extending downwardly along the outer wall 17 of the channel 14 which extends at right angles to the wall 15 and to the flat upper face $c$ of the flange 11.

Mounted in the channel 14 is a packing element F which embodies a resilient ring 18 formed of rubber, rubber composition, or synthetic rubber, or the like, and which ring has a flat upper surface $e$ extending perpendicular to an outer peripheral wall $f$ formed to slidably conform to the side wall 17 of the channel 14. The ring 18 is formed with a beveled face g on its inner periphery leading under the top wall e to form a lip h at the inner margin of the latter. The ring 18 is formed with a downwardly extending flange i on its outer periphery which projects into the recess 16 to afford a broken joint connection between the ring 18 and the bottom wall of the channel 14 and thus aid in effecting a seal between the underside of the ring 18 and the box A as well as between the outer periphery of the ring and the box.

The upper face e of the resilient ring 18 is designed to slidably contact and conform to the flat under surface b of the flange 10 to effect a seal of the joint formed by the contacting surfaces b and c. As a means for maintaining the sealing ring 18 in contact with the flange 10 in compensation of wear of the surface e due to sliding contact of the flange 10 therewith, a metallic spring actuated crowding ring 19 is interposed between the underside of the ring 18 and the bottom of the channel 14. The flange i occupies a very minor portion of the lateral extent of the ring 18, thus providing said ring with a relatively broad surface under its body portion to be engaged by the crossing ring 19.

As here shown the ring 19 is formed with a series of spring tongues j which protrude from the face of the ring so as to be subject to compression between the ring 18 and the bottom of the channel 14 and thereby exert an upward thrust on the sealing ring 18. The spring tongues j may be arranged to protrude inwardly from the outer periphery of the crowding ring 19 as shown in Figs. 3 and 4, or may be formed to project outwardly from the inner periphery of the ring 19 as shown in Fig. 5, and the crowding ring may be positioned to dispose the tongues j to bear either against the underside of the sealing ring 18 or against the bottom wall of the channel 14.

It will be noted that the tongues j constitute springs that are spaced apart at intervals throughout the annular underside of the sealing ring and serve not only to elevate the ring in compensation of wear of its upper surface but also serve to space the underside of the sealing ring from the bottom wall of the channel 14 so that fluid confined in the pump box A under pressure will be directed against the inner face of the resilient flange i to crowd the latter against the back wall of the channel 14 and thereby augment the sealing action of the ring 18.

In the application of the invention, the sealing ring 18 and its associated crowding ring are initially positioned in the channel 14 as shown in Fig. 3, that is, with the parts formed so that the upper portion of the sealing ring will be projected above the upper surface c of the flange 11, so that on positioning the flange 10 in position on the ring 18 and drawing it down by screwing the cap ring E in place both the ring 18 and the spring tongues j will be placed under a state of compression.

The operation of the invention will be apparent from the foregoing, it being manifest that the sealing ring 18 will act in cooperation with the springs j to slidably bear against the underside of the flange 10, and that by the provision of the lip h and the flange i on the sealing ring 18, fluid pressure in the pump box A will aid in pressing the ring 18 into close contact with the surfaces b and 17.

By the construction set forth a leak proof seal is afforded between the flange 10 and the box A and one which will permit of unrestricted movement of the flange 10 in any direction on its plane within the limits of movement of the packing gland D and its associated parts relative to the box A.

It has been found in practice that it is quite essential in the use of shiftable packing gland mountings, the movement of the gland under lateral or side thrusts imposed thereon by the pump rod during pumping operations be unrestricted as to direction on a plane perpendicular to the pump rod, since there are occasions when such movement may be rotary in character, or it may be reciprocal either on straight or curved paths, or may be a combination of such rotary and reciprocal movements. By employing the construction herein set forth the desired freedom of directional movement is attained.

While we have shown and described a specific embodiment of our invention we do not limit ourselves to the exact construction shown, and accordingly the invention embraces such changes in the parts and their arrangement as come within the purview of the appended claims.

We claim:

1. In a packing gland mounting, a cylindrical pump head box having a flat top wall formed with a marginal channel on its inner periphery, a gland housing extending into said box, a circumferential flange on said housing overlying said flat top wall, a resilient sealing ring in said channel, a metallic ring interposed between the bottom of said channel and the underside of said ring, and spring tongues on said ring exerting a pressure between said box and said sealing ring.

2. In a packing gland mounting, a cylindrical pump head box having a marginal channel on its upper inner periphery having a recess in its bottom wall, a resilient sealing ring in said channel having a flange extending into said recess and a body portion with an under face which occupies the greater part of its lateral extent, a packing gland housing extending into said box said housing reciprocating laterally when the pump operates, a flange on said housing against the underside of which said sealing ring bears, and annular spring means in said channel positioned to act against said under face of said seating ring for advancing said sealing ring against said housing flange.

3. In a packing gland mounting for pumps, a box having a cylindrical wall formed with a marginal channel on its inner periphery, a gland housing extending into said box and surrounded by said wall in spaced relation thereto said housing reciprocating laterally during the operation of the pump, a continuous circumferential flange on said gland housing, and a resilient sealing ring in said channel bearing against the under side of said flange, having a marginal lip on its upper inner margin, said lip being upwardly tapered and being positioned to increase the sealing surface under said flange.

4. In a packing gland mounting, a box having a cylindrical wall formed with a smooth flat end face having a marginal channel on its inner periphery, a gland housing extending into said box in spaced relation to said wall, a continuous circumferential flange on said housing extending over and seating on an end face of said wall, a resilient sealing ring in said channel, a crowding ring interposed between said ring and the bottom of said channel, spring tongues on said crowding ring arranged to exert pressure on said sealing ring in the direction of said flange and spacing said sealing ring from the bottom of said channel, and a flange on said sealing ring encircling said crowding ring and bearing against the back wall of said channel.

5. In a packing gland mounting, a box having a cylindrical wall formed with a smooth flat end face having a marginal channel on its inner periphery, a gland housing extending into said box in spaced relation to said wall, a continuous circumferential flange on said housing extending over and seating on an end face of said wall, a resilient sealing ring in said channel, a crowding ring interposed between said ring and the bottom of said channel, spring tongues on said crowding ring arranged to exert pressure on said sealing ring in the direction of said flange and spacing said sealing ring from the bottom of said channel, and a flange on said crowding ring and bearing against the back wall of said channel; said channel being formed with a continuous channel in its bottom wall into which said sealing ring flange projects.

TANNER E. BOYER.
LESTER P. STOCKMAN.